Jan. 20, 1970  F. G. SHANKLIN  3,490,981
APPARATUS FOR HEAT SEALING PLASTIC FILM
Filed March 27, 1967  2 Sheets-Sheet 1

INVENTOR
FRANK GARRETT SHANKLIN
BY,

Porter + Meyer
ATTORNEYS

INVENTOR
FRANK GARRETT SHANKLIN
BY,
Porter + Meyer
ATTORNEYS

United States Patent Office 3,490,981
Patented Jan. 20, 1970

3,490,981
APPARATUS FOR HEAT SEALING PLASTIC FILM
Frank Garrett Shanklin, Hemlock Park Drive,
Groton, Mass. 01450
Filed Mar. 27, 1967, Ser. No. 626,117
Int. Cl. B30b 15/34; B32b 31/20
U.S. Cl. 156—583                                    5 Claims

ABSTRACT OF THE DISCLOSURE

A heat sealing apparatus, particularly of the L-frame type, provided with opposed sealing jaws and having separate and independent means to close the jaws and to apply sealing pressure therebetween. Also, an L-frame heat sealing apparatus in which the pivots for the movable member are located adjacent the respective sealing jaws, with the pivots aligned on a common axis, which axis forms the hypotenuse of a triangle.

BACKGROUND OF THE INVENTION

This invention relates to an apparatus for heat sealing thermo-plastic films. More particularly it relates to a semi-automatic heat sealing apparatus particularly adapted for use in packaging operations to form the final seals about articles packaged in plastic film.

In a particular embodiment, the preferred embodiment, the heat sealer of the present invention performs the function of the conventional L-frame heat sealer and like the conventional L-frame heat sealer is adapted to provide both a transverse seal and a longitudinal seal in a section of centre-folded film within which the article has been inserted. In this embodiment the sealer is mounted as an integral part of a generally horizontally oriented packaging table arranged so that the articles to be packaged may be inserted between the webs of centre-folded film at a first position, and the package sealed at a second position. Generally in this type of heat sealer, the operation is semi-automatic in the sense that an operator inserts the article to be packaged between the folds of the film at the first or packaging position, transfers the article and its associated film to the second or sealing position and then actuates the sealing mechanism.

The sealing mechanism in such a sealer comprises a pair of heat sealing jaws mounted on a frame suspended above the sealing position of the packaging table. On actuation the frame descends squeezing the plastic film between the heat sealing jaws and cooperating elastomeric members mounted on the surface of the packaging table. Normally the sealing jaws are arranged not only to provide a seal, but to trim excess film, it being understood, of course, that because of the trimming function the second transverse seal in a first package is the first transverse seal in a second package. When using center-folded film only a single longitudinal seal is required along the free ends of the folded film since of course the film forms the fourth side of the package.

Since the operator moves the package from the packaging position to the sealing position, it is necessary in designing such a sealing mechanism to mount the sealing mechanism in such a manner that when the frame is in its normal elevated position there is no obstruction on the front of the machine (toward the operator's position) at least between the packaging position and the sealing position that would interfere with, or inconvenience the transfer operation. Thus, in all of the conventional machines of this type, of which I am aware, the sealing jaws are mounted on two sides of a U-shaped frame and the free ends of the U-shaped frame are either pivoted at the rear of the machine (away from the operator's position) or mounted in the same position on a pair of rods extending through bearings mounted in the base of the machine for vertical reciprocal travel. In all such machines also the same means which are used to depress the frame of the sealing mechanism to bring the sealing jaws into the sealing position are used to apply the necessary sealing pressure. Normally pneumatic or electrical devices, such as a pneumatic cylinder or a solenoid, are used as the means to depress the U-shaped frame, and springs or other counter-balancing means are employed to return the frame to its normal elevated position at the end of the sealing cycle.

SUMMARY

There are a number of different factors which must be carefully controlled if one wishes to obtain optimum seals in all portions of the sealed area in each package, and in the sealed areas of successive packages where the packages are formed of thermo-plastic film employing a type of heat-sealing method. For example, amongst these factors (assuming that an impulse sealing system is employed, as is the case in most sealers of the type under consideration) there are the diameter of the wire, the rate at which the wire heats up during the sealing cycle, the maximum temperature of the sealing wire and the dwell time after the energizing current to the sealing wire is turned off until the jaws are released. But even if all of these factors are precisely controlled, uniformly good seals will not result unless the pressure exerted by the jaws is uniform, not only time after time, but also in all portions of the area to be sealed. This is true not only in the particular example of an impulse sealing system, but in most, if not all, other sealing systems also. The principal purpose of this invention is to provide means which will ensure that the degree of pressure applied to the film in the area to be sealed will be consistently uniform during each sequential sealing cycle, and provide means to permit the precise adjustment of the orientation of the jaws to ensure that the pressure applied by the jaws during each sealing cycle is uniform in all portions of the areas to be sealed.

Such uniformity of pressure is difficult to achieve in the conventional L-frame heat sealer, such as those described above, where the sealing jaws are mounted on a U-shaped frame, and the frame is supported entirely from the rear of the machine at or near the ends of the parallel frame members. In the first place the sealing jaws are located on only two of the three arms of the frame, on one of the two parallel side arms and on the cross arm, and the third arm, the other of the two parallel side arms, remains entirely out of contact with the film during the sealing cycle. Where, as is conventional, the downward pressure is applied solely to the two side arms, the fact that the entire sealing force occurs on only one of the side arms, and on the cross arm tends to develop a warping movement. This, of course, can be largely overcome, at least under reasonable pressures, by making the sealing frame sufficiently rigid and sturdy.

But even if this tendency to warp or distort is overcome, the adjustment of the pressure applied by either of the sealing jaws as a function of the position along the jaw remains a very precise and critical matter in this conventional arrangement. The uniformity of the pressure applied by either of the sealing jaws can be regulated only by regulating the vertical position of each of the two points at which the side arms of the frame are located when the frame is in the sealing position. For example, the uniformity of the pressure applied by either sealing jaw as a function of the position along the sealing jaw, can be regulated, where the side arms are pivoted to the rear of the machine, only by regulating the vertical position of either pivot relative to the plane of the packaging table. Adjustment of either pivot will, because of the geometry, tend to change the orientation of both sealing jaws. Thus, if you adjust the two attaching pivots to bring the sealing jaw on the cross arm into perfect alignment, you will probably cause the transverse sealing jaw on the one side arm to go out of alignment. If you then adjust the pivots to bring the transverse sealing jaw into alignment, the sealing jaw on the cross arm will again be forced out of alignment unless both attaching pivots are raised or lowered by precisely the same amount.

Aside from the problems in obtaining and maintaining uniform pressure in all portions of the sealing jaws in a conventional L-frame sealer, there are a number of problems in such sealers which are created by the fact that, conventionally, the same means are used to move the sealing frame from its normal elevated position to its operating position, and to apply the necessary sealing pressure, and these means act on the arms of the U-shaped frame at a point remote from the sealing jaws. The use of positive displacement means to move the sealing frame is pretty well precluded as a practical matter by the fact that the presence of excess material beneath the sealing jaws could well cause excessive forces to develop. On the other hand, any variation in pressure applied by a pressure applying means is magnified at the sealing jaws, by virtue of the fact that the sealing frame is a lever arm.

Most important, is the ever present safety hazard. It must be remembered that the sealing machines of this type are operated in the presence of an operator who, among other things, is required to move semi-finished packages to a position under the sealing jaws. A means designed to develop the pressures on the film necessary to form a good seal will, almost necessarily, develop similar pressures on any other object which happens to be located beneath the jaws as the jaws close. Thus, some sort of a safety device, such as sensing fingers, limit switches, or the like, must be used to prevent the jaws from closing unless the operator is completely free of the path of travel. However, experience indicates that no matter how complicated and sophisticated such a device may be, it is never completely foolproof.

It is a purpose of this invention to provide means separate and distinct from the means employed to close the jaws of the sealing machine, for applying the sealing pressure to the sealing jaws and to locate these means at a position where the sealing pressure actuating force may be applied at a point immediately adjacent the sealing jaws.

It is a further purpose of this invention to reorient the geometry of an L-frame sealing machine to permit the adjustment of either sealing jaw without in any way affecting the adjustment of the other said sealing jaw.

These and other purposes and objects will become readily apparent from the description of the preferred embodiment and from the drawing.

DESCRIPTION OF THE PREFERRED EMBODIMENT

Figure 1:
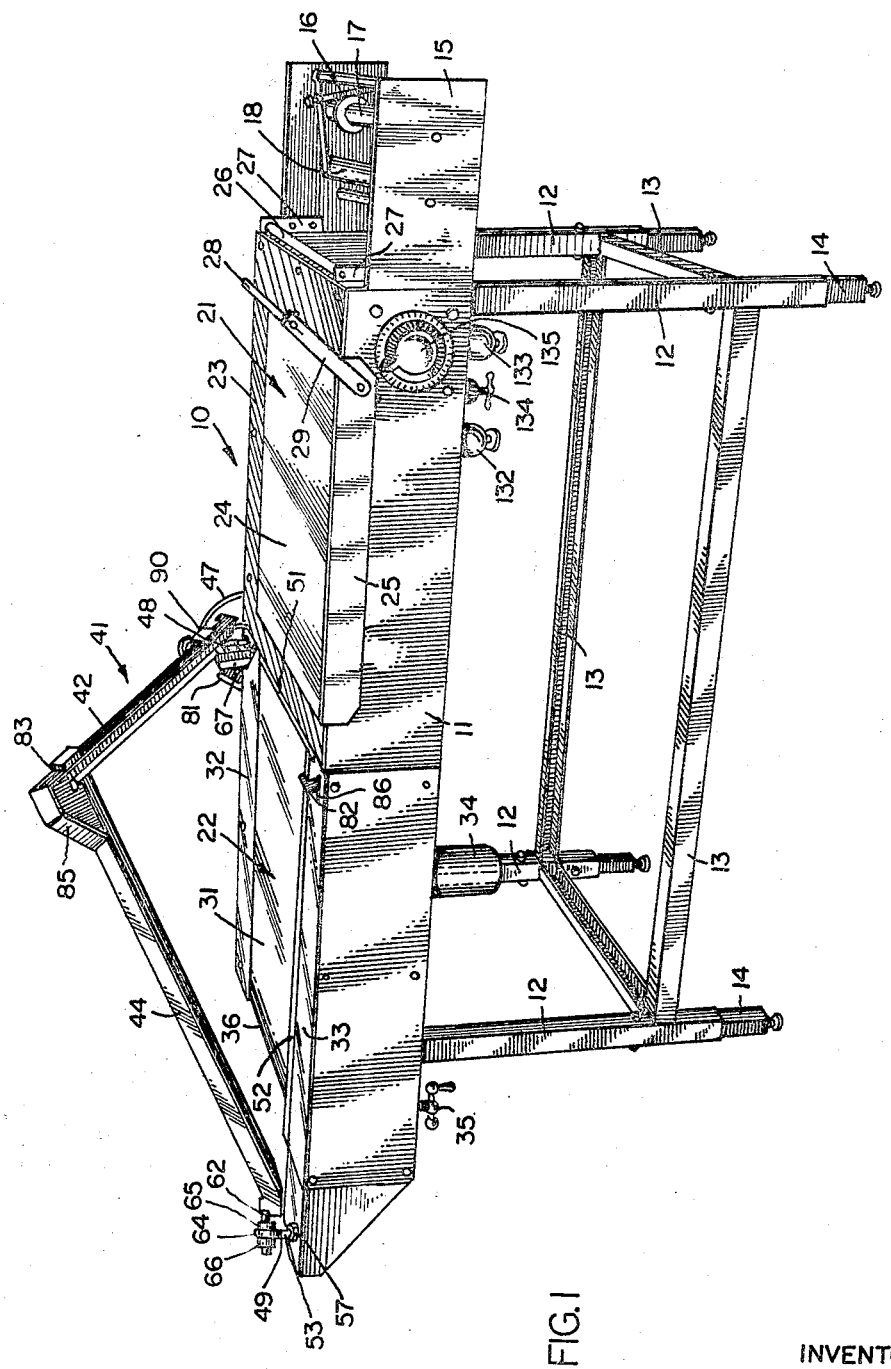
FIG. 1 is a front elevation in perspective of a sealing machine embodying the present invention.

Referring then to the drawing, and particularly to FIG. 1 thereof, a typical sealing machine (indicated generally at 10) embodying the invention of the present application comprises a frame 11 mounted on legs 12. Legs 12 are provided with suitable cross braces 13 and length adjusting means 14. At one end of frame 11, frame extension members 15 are provided as a support for a film supporting and dispensing means 16 indicated generally as rolls 17 and 18.

Machine 10 is divided into two sections, a packaging section indicated generally at 21 and a sealing section indicated generally at 22 both mounted on frame 11. In the packaging section 21 there is a top panel 23 which extends across frame 11 in this section, and a packaging table 24 which overlies top panel 23, and is separate vertically therefrom by a distance sufficient to permit the passage of a web of plastic film therebetween. Packaging table 24 is provided with an integral, downwardly extending front flange 25 and is mounted on means (not shown) permitting a back and forth movable adjustment of table 24.

In operation a roll of center folded film (not shown) is placed on the rollers 17 and 18 of film roll support means 16 with the fold toward the rear of the machine. The free end of the film is passed over roller 26 mounted at the edge of top panel 23 on brackets 27, which in turn are mounted on frame extensions 15. The film is then separated with the lower web portion passing along top panel 23 beneath packaging table 24. The upper web portion of the film is passed over opener bar 28 which is mounted parallel to roller 26 on bracket 29. Bracket 29 is pivotally mounted on flange 25 of table 24, the pivotal mounting, including locking means, whereby the position of bar 28 may be adjusted to provide a suitable elevation of the upper web portion of the film above packaging table 25 and locked into position. The upper web portion of the film is then draped over packaging table 24 with sufficient clearance above the top of table 24, at least adjacent bar 28, to permit the easy insertion of articles to be packaged onto the top of table 24.

It will be understood, therefore, that when an article to be packaged is placed onto the top of table 24 that article is located between the upper web portion of the center folded film which passes over bar 28 and the lower web portion of the film which passes between the bottom of packaging table 24 and the top of top panel 23. From here the article to be packaged is passed to the left (as shown in FIG. 1) onto sealing section 22. After the first transverse seal has been formed in a roll of film the article as it is transferred will contact this seal and during the transfer will push the seal portion before it, thereby automatically unwinding an additional equal portion of film from the supply roll.

Sealing section 22 comprises a sealing table 31 and marginal side portions 32 and 33. Since in center-folded film the upper and lower portions of the web are connected by the folds, it is desirable, if not essential, that the seal be formed at a position centered on the side walls of the package corresponding to the location of the fold. To accomplish this, sealing table 31 is connected to frame 11 by means of an elevator means which permits table 31 to be raised and lowered relative to marginal size strip portions 32 and 33 and to the plane of top panel 23 of packaging section 21. This is conveniently accomplished by means of a simple jack screw arrangement indicated generally by the protective cylinder therefor shown in 34 which arrangement is activated through a chain and sprocket arrangement indicated generally by crank 35. In the particular embodiment shown in FIGS. 1 and 2 of the drawing, sealing table 31 is provided as a conveyor element indicated by belt 36, whereby as soon as the sealing cycle is completed the conveyor element may be actuated preferably automatically to transfer the sealed package toward the next position in the packaging line such as a shrink tunnel. The minimum size of sealing table 31 is determined by the size of the package to be formed, it being understood, of course, that the table is at least the size of such package and may be as much larger as desired.

Marginal strip portions 32 and 33 are mounted on frame 11 on either side of sealing table 31 and act as extensions of top panel 23. Downwardly facing metal flanges (not shown) may be provided on the sides of strip portions 32 and 33 and of panel 23 facing sealing table 31 to provide corresponding sides for sealing table 31 when table 31 is in a lowered position.

Sealing mechanism 41 comprises a generally L-shaped frame member 42 formed of a transverse member 43 and a longitudinal member 44 which are joined together at substantially right angles with the end of longitudinal member 44 abutting the side of transverse member 43 near the end thereof. Transverse sealing jaw 45 is mounted on the inner face of transverse member 43 and longitudinal sealing jaw 46 is mounted on the inner face of longitudinal member 44 with the end of jaw 46 abutting the side of jaw 45 near the end thereof. Sealing jaws 45 and 46 each comprises an insulating backing member having a planer lower face, the backing member being so mounted that the lower face extends slightly below the bottom of the respective frame member with the lower face of both backing members being located on a common plane. A sealing wire is arranged along the face of each backing member and mounting means are provided on said frame members for the sealing wires. The sealing wire associated with jaw 45 crosses the sealing wire associated with jaw 46 at the point of intersection to provide a continuous L-shaped seal in the film being sealed. Means indicated generally by power supply cable 47 are provided to supply the sealing wires with an activating current, and the mounting means for the sealing wires includes for each sealing wire a tensioning means adapted to keep both wires taut at all times during the operating cycle. The tensioning means are mounted on the frame members beyond the free end of the respective jaws.

The free ends of transverse member 43 and longitudinal member 44 of frame member 42 are pivotally mounted at 48 and 49 respectively to side strips 32 and 33 respectively to permit the reciprocal motion of frame member 42 between an elevated position where the common junction between members 43 and 44 is raised substantially above the level of side strips 33 and 34, and an operating position where sealing jaws 45 and 46 come into contact with lower sealing jaws or sealing beds 51 and 52 respectively. Lower transverse sealing jaw 51 comprises a resilient body member mounted on that edge of top panel 23 of packaging section 21 which faces sealing table 31. Lower longitudinal sealing jaw 52 comprises a resilient backing member mounted in that edge of side strip 33 which faces sealing table 31. Lower sealing jaws 51 and 52 are both provided with a planar top surface and are so mounted that this top surface protrudes slightly to a common plane above the plane of the respective members to which they are mounted. The end of lower sealing jaw 52 abuts the side of lower sealing jaw 51 near the end thereof and lower sealing jaws 51 and 52 are aligned to substantially coincide throughout their entire length with the corresponding upper sealing jaws 45 and 46.

Figure 2:
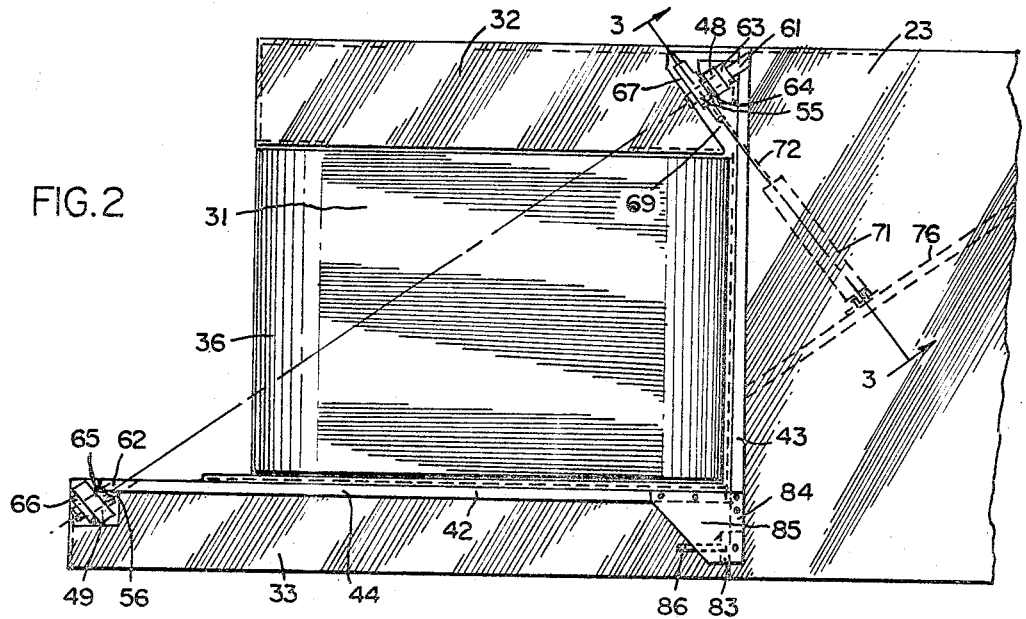
FIG. 2 is a top plan view of the sealing section of the machine shown in FIG. 1.

Each member of the pair of mating sealing jaws comprising upper and lower transverse sealing jaws 45 and 51 has substantially the same length as does each member of the pair of mating sealing jaws comprising upper and lower longitudinal sealing jaws 46 and 52. The length in each case from the common intersection of the two upper sealing jaws and of the two lower sealing jaws is sufficient to insure that a seal will be formed across the full length and width of the package to be formed. In this connection it will be noted that the sealing table 31 is at least as large as the package to be formed. For this reason the distance between the facing edges of side strips 32 and 33 is sufficient to receive lower transverse sealing jaw 51 and this sealing jaw together with its corresponding upper transverse sealing jaw 45 will normally extend some proportion of the distance between side strips 32 and 33 up to the full distance. Longitudinal sealing jaws 46 and 52 on the other hand may, if desired, extend beyond the length of sealing table 31 in which case, of course, as shown in FIGS. 1 and 2, side strip 33 is substantially longer than table 31.

As mentioned above, frame member 42 is pivotally mounted near the free ends of frame members 43 and 44 at pivots 48 and 49. The particular means of mounting is an important aspect of this invention. Each pivot 48 and 49 comprises a threaded post 53 surmounted by a bearing cage or pillow block 54. While in effect, as mentioned above, pivot 48 is mounted in side strips 32 and pivot 49 is mounted in side strip 33, as a practical matter it is desirable (as shown) to mount pivot 48 on a horizontal pivot support plate 55 and pivot 49 on a horizontal pivot support plate 56. Pivot support plates 55 and 56 are attached directly to frame 11 and are each formed of a rigid enough member to ensure the preservation of the precise alignment of pivots 48 and 49. Suitable cut-outs are formed in side strips 32 and 33 to accommodate pivot support plates 55 and 56. The pivot post 53 of each pivot 48 and 49 is inserted through an appropriate aperture formed in support plate 55 and 56 respectively and is secured in place by a pair of nuts 57 and 58 mounted on the threaded portion of post 53 and located one above and one below the appropriate plate 55 or 56 as the case may be.

A shaft 61 is journaled in pillow block 54 of pivot 48 and is held in place by shaft surounding split rings 63 and 64 located on either side of pillow block 54. A shaft 62 is journaled in pillow block 54 of pivot 49 and is similarly held in place by split ring 65 and 66. Pivots 48 and 49 are carefully adjusted so that shafts 61 and 62 are, insofar as possible, precisely actually aligned (as if they both formed a portion of a continuous shaft). With shafts 61 and 62 so aligned frame member 42 is positioned with upper jaw members 45 and 46 in contact with and in alignment with lower jaw members 51 and 52 respectively, and the free ends of members 43 and 44 respectively are securely attached to shaft 61 and 62 respectively. While, for simplicity of description, the alignment of the parts has been described in terms of an assembly of the parts on a machine, it will be understood, of course, that in actual production shafts 61 and 62 would be attached to frame member 42 while utilizing an apropriate fixture designed to ensure the desired precise alignment of the parts.

This results in an arrangement where the two pivot bearings for the sealing mechanism 41 lie in the same axis but with the pivot axis running diagonally across the corners of the L-shaped frame member 42. This in effect forms a triangle (a right triangle in the case of the preferred embodiment) with the pivot axis forming the hypotenuse. If the clamping pressure is applied at the free corner of the triangle, the corner, in this case, opposite the hypotenuse, several important advantages accrue. One is that the adjustment of either pivot 48 or 49 will affect only the sealing pressure on the particular sealing jaw 45 or 46 most closely associated therewith. Another is that since the sealing arm is captured at the corner of the L rather than at some point in space other than that corner, there is no need for a heavy casting or fabrication to provide for the uniformity of pressure along the sealing arms. A simple piece of bar stock is sufficient.

The precise geometry of the sealing mechanism however is not quite as simple as would appear at first glance. It will be remembered that in the preferred embodiment, the pivot axis is the hypotenuse of a right triangle with transverse members 43 and longitudinal member 44 forming the other two sides of the triangle. As frame member 42 is rotated about the pivot axis between its open and its operating or sealing position, each portion of frame member 42 on the same plane as the plane of the pivot axis will describe a circle having the pivot axis as its center and having a radius equal to the perpendicular distance of the point in question from the pivot axis.

If the pivot axis is located on the same plane as that of the sealing wires, a real problem exists in the fact that very little vertical clearance is obtained especially near the pivot points. For example, if it is assumed that longitudinal frame member 44 has a cross-sectional dimension of 2″ in height by 1″ in width, that sealing jaw 46 is mounted on the inner face of longitudinal frame member 44 and has a cross-sectional dimension of ¼″ by ¼″, then at a point where the perpendicular distance from the pivot axis to the inner face of longitudinal member 44 is 4″ and where the pivot axis is located on the plane of the sealing wire, the clearance over a package having a vertical side wall which side wall is located ¼″ away from the inner edge of jaw 46 when jaw 46 is in its sealing position is about 1¼″. At this point which corresponds to a 20° opening, the lower inner edge of jaw 46 would just clear the upper outer edge of the package. Obviously it is undesirable for the jaw to contact the corner of the package. Such contact may injure the film at the point of contact. There is even a greater danger that the resulting pull on the film from such contact would disrupt the still soft seal if the contact occurs as the frame member 42 is returning to its raised or open position. Under these circumstances the maximum permissible package height can be increased either by increasing the distance between the seal line and the edge of the package, or by increasing the radius of the arc of revolution. There are very definite limitations on the permissible distances between the side of the package and the seal line, especially if a tightly overwrapped package is desired. On the other hand, since the radius of the arc of revolution is in direct proportion in a given sealing apparatus to the distance from the pivot point, an increase in this radius is accomplished only by making the transverse and longitudinal extent of frame member 42 substantially larger than the article to be packaged. Thus a relatively large machine would be required to seal a relatively small package especially if the package had any substantial height.

On the other hand, if the pivot axis is raised to a level above the plane of the wire, the sealing jaw tends to move away from the side of the package as the frame member opens. For example, if the pivot axis is raised 2″ above the plane of the sealing wire, then in the example above where the radius at a given point is 4″, where the frame member has a cross-sectional dimension of 2″ in height by 1″ in width, and where the sealing jaw has a cross-sectional dimension of ¼″ by ¼″, a vertical sided package located ¼″ away from the side of the sealing jaw when the sealing jaw is in the sealing position, has a maximum permissible height of 4″. In this case the closest approach of the sealing mechanism to the package occurs between the upper inner corner of the frame member and the upper outer corner of the package with the sealing jaw itself clearing the package by a comfortable margin. Even if the side of the package is so located that it is in contact with the side of the sealing jaw when the sealing jaw is in the sealing position, a package having a maximum height of 3⅜″ above the plane of the lower sealing jaw can be accommodated with the clearance being again limited by the arc described by the upper inner corner of the frame member. The sealing jaw in this instance clears the side of the package by a comfortable margin at all points (except of course when the sealing jaw is in the sealing position).

I have found that for most packaging uses an elevation of the pivot axis above the plane of the sealing wires of about 2″ is quite satisfactory. This is accomplished readily in the particular sealing machine described herein by attaching the top surface of transverse frame member 43 and the top surface of longitudinal frame member 44 to the bottom of shafts 61 and 62 respectively.

As mentioned above, when the pivot axis is so elevated the upper sealing jaws tend to have a sideways component of motion as they approach the lower sealing jaws. This sideways component of motion is most pronounced immediately adjacent the pivot point where the effective radius of the arc of rotation is at the minimum. I have found, however, that if the sealing pad is terminated in each case at a point somewhat removed from the corresponding pivot this tendency is reduced sufficiently that it can be ignored for all practical purposes. In a particular machine where the transverse member 43 is about 26″ long (from the pivot to the point of intersection with the longitudinal member 44) and the longitudinal member 44 is about 38″ long, terminating the sealing pads at about 5″ to 6″ from the respective pivots gives satisfactory results. As mentioned above, the tensioning means for the sealing wire may conveniently be mounted in this area.

Figure 3:
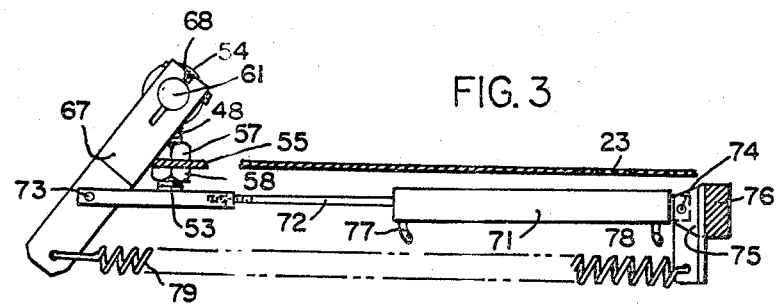
FIG. 3 is a cross section in elevation along line 3—3 of FIG. 1.

The raising and lowering mechanism for sealing mechanism 41, as shown in detail in FIG. 3, comprises a crank arm 67 which is attached to shaft 61 by means of a split tensioning device 68 and which extends generally downwardly through slot 69 provided for this purpose between back side strip 32 and pivot mounting plate 55. An air cylinder 71 is provided beneath panel 23 with its piston shaft 72 pivotally mounted at 73 to the lower portion of crank arm 67, and with its other end pivotally mounted at 74 to bracket 75 which in turn is mounted on cross brace 76 extending beneath panel 23. The air supply to cylinder 71 is generally indicated by nipples 77 and 78. Preferably sealing mechanism 41 is counterbalanced by a spring 79 mounted beneath cylinder 71 between crank arm 67 and bracket 75. Both cylinder 71 and spring 79 are of course aligned with the throw of crank arm 67.

Spring 79 is selected to have sufficient force to return sealing mechanism to its elevated position at a convenient rate. Air cylinder 71 is selected to have a sufficient travel to accommodate the full travel of crank arm 67 and preferably is of a relatively small diameter whereby it only exerts sufficient force under the operating air pressure to overcome the tension of spring 79 and to lower the sealing mechanism at a convenient rate of speed. A net force of between about 5 and 15 pounds is desirable. A low net force of this magnitude is possible because the only function of air cylinder 71 is to lower sealing mechanism 41 to the sealing position and air cylinder 71 is not required to apply any part of the sealing pressure. With a net closing force of only 5 to 15 pounds no extra protective devices are required for the protection of the operator. The movement of the sealing mechanism 41 can be stopped at any point without any possibility of harm.

If desired (adjustable means may be provided for limiting the elevation for which sealing mechanism 41 may rise. A convenient way to accomplish this is to provide shaft 61 with a second crank arm 81 adapted to contact side strip 32 or frame 11 as sealing mechanism 41 pivots to its elevated position. Crank 81 may be provided with a split collar arrangement similar to that provided for crank 67 to permit easy adjustment.

A front toggle element 82 is provided to provide the sealing pressure. Front toggle element 82 engages a toggle receiving member 83 mounted on the lower portion of the forward extension 84 of transverse member 43 (i.e. that portion of transverse member 43 which extends beyond its intersection with longitudinal member 44). A generally triangular cover plate 85 may be provided between forward extension 84 of transverse frame member 43 and the neighboring portion of longitudinal frame member 44.

Figure 4:
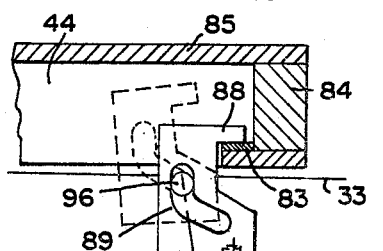
FIG. 4 is a detail drawing in elevation of one version of the latching and sealing-pressure applying means of the present invention.
Figure 5:
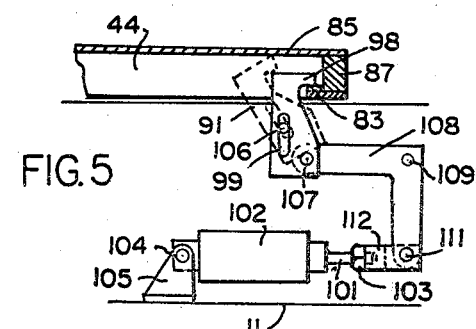
FIG. 5 is a detail drawing in elevation of an alternative form of the device shown in FIG. 4.

In the version shown in FIGS. 4 and 5 toggle element 82 extends through a slot 86 provided in front side strip 33 to engage toggle receiving member 83, which in this case is a laterally extending tab fastened to the underside of extension 84 of transverse frame member 43.

Referring to FIG. 4 toggle element 82 comprises a generally rectangular toggle member 87 provided with a cut-out portion on its forward face (i.e. the face adjacent toggle receiving member 83) the cut-out portion being so shaped as to leave a receiving member engaging forward extension 88. Toggle member 87 is provided with an internal slot 89 which extends in the view shown in FIG. 4 generally vertically downwardly near its upper portion and then toward the right near its lower portion. The lower edge of toggle member 87 is fastened to piston shaft 91 of single acting air cylinder 92 by means of a length adjusting means indicated generally by nut 93. Air cylinder 92 which is provided with an internally mounted spring return is pivotally mounted at 94 to bracket 95 mounted on frame 11. Toggle member 87 is fastened to frame 11 by means of roller member 96 which is pivotally attached to frame 11 just beneath side strip 33 and extends across slot 86 in side strip 33 and through slot 89 of toggle member 87.

After frame member 42 has been lowered to the sealing position where the upper sealing jaws 45 and 46 are adjacent the corresponding lower sealing jaws 51 and 52 with the film to be sealed therebetween by the operation of air cylinder 71, air cylinder 92 is actuated retracting piston shaft 91. This pulls toggle member 87 downwardly guided by roller member 92 and internal slot 89. As toggle member 87 moves downwardly forward extension 88 moves forward engaging on its lower surface the upper surface of the laterally extending tab which comprises toggle receiving member 83. Air cylinder 91 is generally of the short stroke wide piston diameter variety and is selected to exert, under the operating air pressure, the desired pressure between the sealing jaws. After the sealing cycle has been completed, cylinder 92 is de-energized permitting the spring return to move shaft 91 in the reverse direction thereby releasing frame member 42. The movement of toggle member 87 is such that unless frame member 42 is substantially in its sealing position forward extension 88 cannot contact toggle receiving member 83. Thus if anything other than the film to be sealed is contained between the sealing jaws, it is physically impossible to apply the sealing pressure. The action of air cylinder 92 is initiated by a suitable circuit including for example a mercury level switch mounted as at 90 on frame member 42, or a microswitch mounted on the sealing table in a position to contact frame member 42 when it descends sufficiently. The release of toggle 87 can be effected by a timing circuit initiated either by the actuation of air cylinder 92 or by the timing of the wire actuating portion of the sealing cycle.

The action of the toggle 82 shown in FIG. 5 is substantially the same. Here however, toggle member 97 is provided with a vertical internal slot 99 and the toggle member is pivotally mounted at 107 to one end of a right angle crank element 108 which in turn is pivotally mounted at its mid portion, as indicated at 109 to frame 11. The free end of crank 108 is pivotally mounted at 111 to extension 112 of piston shaft 101 of air cylinder 102. Air cylinder 102 is pivotally mounted at 104 to pivot mounting 105 attached to frame 11. In this arrangement, air cylinder 102 is mounted horizontally. Length adjusting means indicated by nut 103 may be provided between piston shaft 101 and extension 112. In this version toggle member 97 is actuated by the extension of piston shaft 103 from cylinder 102. As shaft 101 extends, crank arm 108 is rotated about pivot 109 causing the location of pivot 107 to drop. This pulls toggle member 97 down, causing slot 99 to move relative to roller member 106 and pulling forward extension 98 forward and into contact with the upper portion of toggle receiving member 83.

Figure 6:
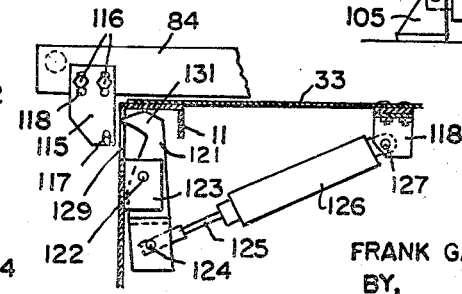
FIG. 6 is a detail drawing in elevation of a second alternative form of the device shown in FIGS. 4 and 5.

Under some circumstances the upward extension of toggle element 82 through slot 86 in the upper surface of front strip 33 may be undesirable. This can be avoided by using the toggle arrangement shown in FIG. 6. In this version, the forward extension 84 of transverse frame member 43 is extended beyond the edge of side strip 33. Toggle receiving member 83 comprises a pair of downwardly extending brackets 115 mounted one on either side of frame extension 84 by means of bolts 116. A horizontally extending roller 117 is pivotally mounted between brackets 115 in a position whereby when sealing member 41 is in the sealing position roller 117 is located in front of frame 11 below the level of side strip 33. Vertical adjustment of bracket 115 is provided by slots 118 therein through which bolts 116 extend. Toggle element 82 comprises a vertical member 121 pivotally mounted near its mid-point at pivot 122 to bracket 123 which in turn is mounted on the inner side of frame 11. The lower portion of member 121 is pivotally mounted at 124 to piston shaft 125 of air cylinder 126. Air cylinder 126 is pivotally mounted at 127 to bracket 128 which is fastened to the underside of side strip 33. A slot 129 is provided in the side of frame 11 through which the upper portion of vertical member 121 extends when piston shaft 125 of air cylinder 126 is retracted. The forward edge of the upper portion of vertical member 121 is provided with a cut-out portion forming forward extension 131, the underside of which is adapted to engage the upper surface of roller 117 when member 121 extends through slot 129 and when sealing member is in its sealing position. Preferably the lower surface of forward extension 131 is formed as a camming surface in the sense that it is shaped as a curve having a decreasing radius about pivot 122 so that after it engages roller 117 and continues to move out through slot 129 it will exert an ever increasing downward pressure on roller 117.

It will be understood of course that since in the operation of the present invention the means for raising and lowering the sealing frame is independent of the means for applying the sealing pressure, the apparatus can be adapted for hand operation merely by eliminating air cylinder 71. It will also be understood that while the description of the preferred embodiment is in terms of a machine adapted to form straight transverse and longitudinal seals, curved seals may also be formed by appropriately shaping the sealing jaws. It will also be understood that the disclosed air cylinders may be replaced by other equivalent devices such as solenoid mechanisms.

The apparatus may be provided with any conventional controls as indicated by air filters 132 and 133, air valve 134 for the compressed air supply, and by variable transformer 135 for the adjustment of the voltage to the sealing wires.

I claim:
1. An apparatus for heat sealing plastic film comprising at least one fixed, elongated heat sealing jaw mounted on a support means, and at least one movable elongated heat sealing jaw pivotally mounted on said support means wherein said movable jaw is adapted to move between a position remote from said fixed jaw and a position adjacent said fixed jaw, said jaws in said adjacent position adapted to form a seal under heat and pressure in a plastic film contained therebetween, means for moving said movable jaw between said remote position and said adjacent position and separate and distinct means for applying a sealing pressure between said jaws, said means for applying sealing pressure comprising a toggle element mounted in said support means at a point remote from said pivotal mounting means and adapted to engage a toggle receiving member attached to said movable jaw when said movable jaw is in a position adjacent said fixed jaw, said toggle element being connected to motor means adapted to move said toggle element into and out of engagement with said toggle receiving member, said toggle element being adapted to cooperate with said motor means to pull said movable jaw toward said fixed jaw, when said toggle element is engaged with said toggle receiving member, and thereby apply sealing pressure.

2. A heat sealing apparatus as claimed in claim 1 wherein said fixed jaw and said movable jaw each comprises a pair of elongated sealing jaws mounted at substantially right angles one to the other with the end of one jaw in each said pair in abutting relationship with the other jaw in each said pair with the operative faces of each said pair lying on a common plane, wherein said pair of movable jaws are mounted on a generally L-shaped frame, wherein the pivotal mounting means for said pair of movable jaws comprises a pair of pivot means, one said pivot means located at each free end of said generally L-shaped frame, and wherein said means for applying a sealing pressure between the pair of fixed jaws and the pair of movable jaws is located adjacent the intersection of the jaws in each said pair.

3. A heat sealing apparatus as claimed in claim 2 wherein each said pivot means comprises a pivot support including a pillow block mounted on said support means and a pivot shaft journaled in said pillow block and mounted on said generally L-shaped frame, and wherein both said pivot shafts are mounted on a common axis extending therebetween, said common axis being parallel both to the common plane of the pair of fixed sealing jaws and to the common plane of the pair of movable sealing jaws.

4. A heat sealing apparatus as claimed in claim 3 wherein said generally L-shaped frame has a substantial thickness and wherein said pivot shafts are mounted on the top of said generally L-shaped frame whereby the common axis of said pivot shafts is removed a substantial distance from the common plane of said pair of fixed jaws.

5. A heat sealing apparatus as claimed in claim 4 wherein said means for applying a sealing pressure comprises a toggle element mounted on said support means adapted to engage a toggle receiving member provided in said L-shaped frame at a point adjacent the common intersection of the members comprising said frame when said pair of movable sealing jaws are in a position adjacent said pair of fixed sealing jaws, said toggle element including means for moving said toggle element into and out of engagement with said toggle receiving member, and when in engagement with said toggle receiving member to pull said L-shaped frame toward said support means.

References Cited

UNITED STATES PATENTS

| 2,509,439 | 5/1950 | Langer | 156—583 |
| 2,725,091 | 11/1955 | Miner et al. | 156—583 |
| 2,919,530 | 1/1960 | Garson et al. | 53—182 |
| 3,015,600 | 1/1962 | Cook | 156—515 |
| 3,016,673 | 1/1962 | Parker | 53—373 |
| 3,239,993 | 3/1966 | Cherrin | 53—390 |
| 3,276,940 | 10/1966 | Shabram | 156—515 |
| 3,323,282 | 6/1967 | Duns | 53—373 |
| 3,369,953 | 2/1968 | Fener | 156—583 |

HAROLD ANSHER, Primary Examiner

W. E. HOAG, Assistant Examiner

U.S. Cl. X.R.

53—373; 100—93